US008385408B2

(12) United States Patent
Kim et al.

(10) Patent No.: US 8,385,408 B2
(45) Date of Patent: Feb. 26, 2013

(54) IMAGE DISPLAY APPARATUS, IMAGE TRANSMITTING APPARATUS, IMAGE TRANSMITTING METHOD AND RECORDING MEDIUM

(75) Inventors: Duk-Sung Kim, Seoul (KR); Hyun Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 545 days.

(21) Appl. No.: 12/627,905

(22) Filed: Nov. 30, 2009

(65) Prior Publication Data
US 2010/0135382 A1 Jun. 3, 2010

(30) Foreign Application Priority Data
Dec. 1, 2008 (KR) ........................ 10-2008-0120273

(51) Int. Cl.
*H04B 1/66* (2006.01)
(52) U.S. Cl. ........... 375/240.01; 375/240.26; 348/14.02; 348/14.12; 348/14.15; 348/14.14
(58) Field of Classification Search ............. 375/240.01, 375/240.26; 348/14.02, 14.12, 14.14, 14.15
See application file for complete search history.

(56) References Cited

U.S. PATENT DOCUMENTS

| | | | | |
|---|---|---|---|---|
| 6,871,006 | B1 * | 3/2005 | Oguz et al. | 386/346 |
| 7,840,119 | B2 * | 11/2010 | Eifrig et al. | 386/329 |
| 2007/0025688 | A1 * | 2/2007 | Pejhan | 386/68 |

* cited by examiner

*Primary Examiner* — Shawn An
(74) *Attorney, Agent, or Firm* — Birch, Stewart, Kolasch & Birch, LLP (57) ABSTRACT

An image transmitting apparatus including a database configured to store first moving image data for multiple speed reproduction separately generated from second moving image data for normal speed reproduction, the first moving image data being constructed using I-frames selected from a plurality of group of pictures (GOPs) included in the second moving image data; a data transceiver configured to receive a signal requesting a bit stream for reproducing a moving image at an arbitrary multiple speed, and to transmit the bit stream for reproducing a moving image at an arbitrary multiple speed according to the signal; and a controller configured to control transmission of the bit stream for reproducing a moving image at the arbitrary multiple speed based on the first moving image data stored in the database.

19 Claims, 8 Drawing Sheets

IMAGE DISPLAY APPARATUS, IMAGE TRANSMITTING APPARATUS, IMAGE TRANSMITTING METHOD AND RECORDING MEDIUM

CROSS-REFERENCE TO A RELATED APPLICATION

Pursuant to 35 U.S.C. §119(a), this application claims the benefit of earlier filing date and right of priority to Korean Application No. 10-2008-0120273, filed on Dec. 1, 2008, the content of which is incorporated by reference herein in its entirety.

BACKGROUND OF THE INVENTION

1. Field of the Invention

The present invention relates to method and apparatus for transmitting and reproducing a moving image by using a streaming service, and particularly, to an image transmitting apparatus and an image transmitting method for reproducing a moving image at a multiple speed, an image display apparatus for reproducing a moving image at a multiple speed, and a storage medium having moving image data recorded thereon, the data being able to be reproduced at a multiple speed.

2. Background of the Invention

A streaming service indicates a service having video (i.e., moving picture, moving image, etc.) data downloaded from a server into an image display apparatus via a network and simultaneously reproduced to output the moving picture.

Moving image data transmitted via a network has a specific file format specification. For a streaming service via an Internet protocol (IP) network, moving image data is generated and transmitted according to a moving picture expert group (MPEG) standardization established by the MPEG, which is a moving picture research group under the International Organization for standardization (ISO/IEC).

Examples of image display apparatuses, each of which receives such moving image data from a server through a streaming service on a network and reproduces the same, include stationary terminals, such as desktop computers, IP TVs and the like, and mobile terminals, such as mobile communication terminals, navigation apparatuses, telematics terminals, portable multimedia players (PMPs), laptop computers and the like.

Reproducing a moving image by using a streaming service, has required many methods of reproducing a moving image at a speed different than a normal speed.

SUMMARY OF THE INVENTION

Therefore, an object of the present invention is to provide a method capable of receiving and reproducing moving image data that can be reproduced at a multiple speed by a client of a streaming service.

To achieve these and other advantages and in accordance with the purpose of the present invention, as embodied and broadly described herein, there is provided an image transmitting apparatus, comprising: a database configured to store first moving image data for multiple speed reproduction separately generated from second moving image data for normal speed reproduction, the first moving image data being constructed using I-frames selected from a plurality of group of pictures (GOPs) included in the second moving image data; a data transceiver configured to receive a signal requesting a bit stream for reproducing a moving image at an arbitrary multiple speed, and to transmit the bit stream for reproducing a moving image at an arbitrary multiple speed according to the signal; and a controller configured to control transmission of the bit stream for reproducing a moving image at the arbitrary multiple speed based on the first moving image data stored in the database.

To achieve these and other advantages and in accordance with the purpose of the present invention, as embodied and broadly described herein, there is also provided an image display apparatus, comprising: a signal transceiver configured to transmit a signal requesting a bit stream for reproducing a moving image at an arbitrary multiple speed, and to receive the bit stream for reproducing a moving image at an arbitrary multiple speed; and a controller configured to reproduce the moving image at an arbitrary multiple speed through an image output unit. The bit stream for reproducing a moving image at the arbitrary multiple speed may be generated using first moving image data for multiple speed reproduction separately generated from second moving image data for normal speed reproduction, the first moving image data constructed using I-frames selected from a plurality of group of pictures (GOPs) included in the second moving image data.

Also, to achieve these and other advantages and in accordance with the purpose of the present invention, as embodied and broadly described herein, there is still also provided an image transmitting method, comprising: storing first moving image data for multiple speed reproduction separately generated from second moving image data for normal speed reproduction, the first moving image data being generated using I-frames selected from a plurality of group of pictures (GOPs) included in the second moving image data; receiving a signal requesting a bit stream for reproducing a moving image at an arbitrary multiple speed; and transmitting the bit stream for reproducing the moving image at the arbitrary multiple speed according to the signal.

To achieve these and other advantages and in accordance with the purpose of the present invention, as embodied and broadly described herein, there is yet still also provided a storage medium, comprising: first moving image data for normal speed reproduction; and second moving image data for multiple speed reproduction separately generated from the first moving image data and generated using I-frames selected from a plurality of group of pictures (GOPs) included in the first moving image data.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a construction of a streaming service according to the present invention will be described with reference to the drawing.

Figure 1:
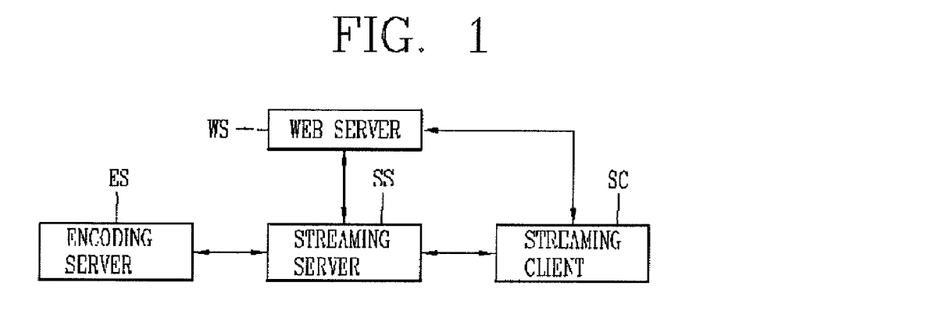
FIG. 1 is a block diagram of a streaming service system providing a streaming service according to one embodiment of the present invention.

FIG. 1 is an overview of a streaming service system providing a streaming service according to an embodiment of the present invention. As shown in FIG. 1, the streaming service system includes a web server WS, a streaming server SS, a streaming client SC, and an encoding server ES, which receives real-time video information from a contents provider CP. In particular, the encoding server ES converts video information received in real time into video data in a video format used for a streaming service. The encoding server ES then transmits the video data to the streaming server SS.

Figure 2:
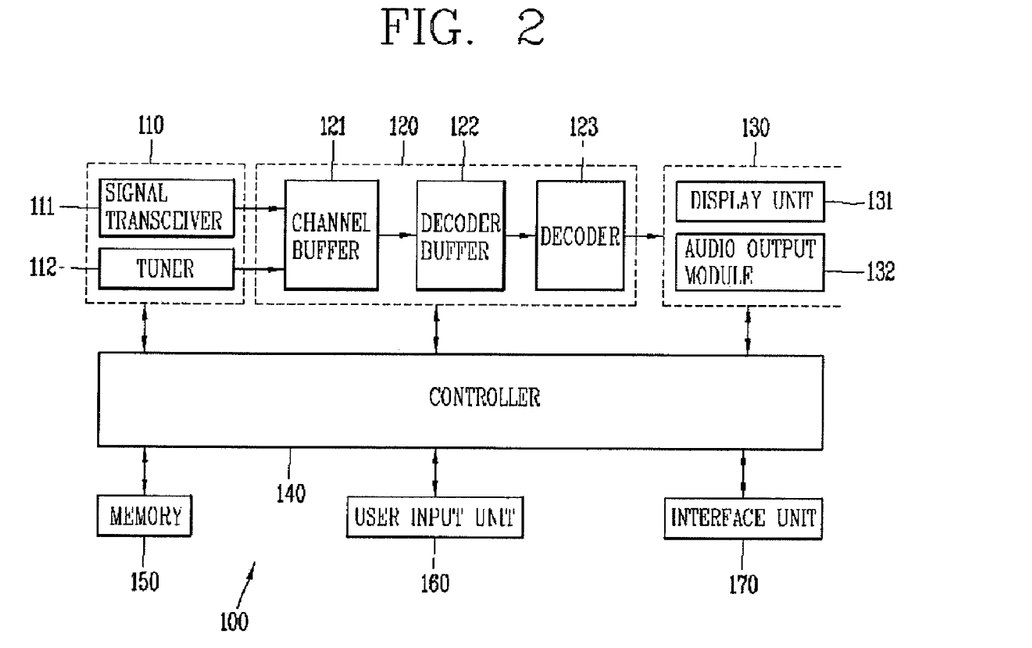
FIG. 2 is a block diagram of an image display apparatus according to one embodiment of the present invention.
Figure 3:
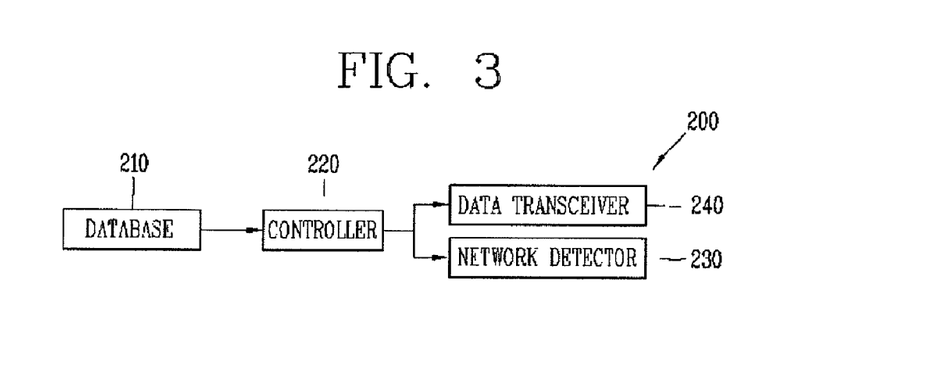
FIG. 3 is a block diagram of an image transmitting apparatus according to one embodiment of the present invention.

Further, the streaming client SC includes an image display apparatus 100 for reproducing received video data (see FIG. 2), and the streaming server SS includes an image transmitting apparatus 200 (see FIG. 3). Also, when the streaming client SC requests streaming data, the streaming server SS transmits the data to the streaming client SC. The streaming server SS can also read a header of the stored video data to determine the format, bit rate and the like of the video data to be transmitted, and determine a proper data transmission speed based upon the determined format, bit rate and the like.

In addition, the streaming server SS can transmit statistical information (e.g., a time stamp, the number of cumulative packets, etc.) of the network to the streaming client SC, and also receive statistical information (e.g., the number of cumulative packets lost, packet jitter, etc.) from the streaming client SC. The streaming server SS also detects transmission environments of the network based upon the statistical information. Further, the network transmission environments may include transmission or non-transmission of video data between the streaming server SS and the streaming client SC, available bandwidth information upon transmission, etc.

The streaming server SS can also receive video data in real time from the encoding server ES or another server and transmit the received video data to the streaming client SC. In addition, the streaming client SC can access the streaming server SS via the web server WS or directly access the streaming server SS to request video data. The streaming client SC and the web server WS can also be connected to each other via an Internet network.

In addition, in FIG. 1, the web server WS is connected to the streaming server SS, and thus the streaming client SC can receive a list of video data provided by the streaming service via the web server WS. The streaming client SC can also transmit a request signal to the streaming server SS via the web server WS to request video data. The streaming client SC can also receive the streaming service using a web page provided via the web server WS.

Further, the web server WS can provide a list of video data which can be provided to the streaming client SC through the streaming service. The web server WS can command the streaming server SS to transmit video data to the streaming client SC in response to the video data request from the streaming client SC.

Hereinafter, the image display apparatus 100 in FIG. 2 according to an embodiment of the present invention will be described. The image display apparatus 100 refers to electronic equipment that can reproduce received moving pictures such as televisions, DVD players, optical disk players, mobile phones, smart phones, notebook computers, digital broadcast terminals, personal digital assistants (PDAs), portable multimedia players (PMPs), navigation apparatuses and the like.

As shown in FIG. 2, the image display apparatus 100 includes an image receiver 110, an image processor 120, an image output unit 130, a controller 140, a memory 150, a user input unit 160 and an interface unit 170. However, all of the illustrated components are not a requirement, and greater or fewer components may alternatively be implemented. In addition, the image receiver 110 can receive an external image signal and/or image associated information, and transmit the received image signal and/or image associated information to the image processor 120. In FIG. 2, the image receiver 110 includes a signal transceiver 111 and a tuner 112.

The signal transceiver 111 can receive external signals input via external devices such as digital versatile disks (DVDs), set top boxes, camcorders and/or networks such as wired/wireless Internet network and the like. Examples of wireless Internet networks include Wireless LAN (WLAN) (Wi-Fi), Wireless Broadband (Wibro), Worldwide Interoperability for Microwave Access (Wimax), High Speed Downlink Packet Access (HSDPA) and the like. Examples of wired Internet networks include Ethernet, the hybrid fiber coax (HFC) network, the asymmetric digital subscriber line (ADSL) network, the very high-data rate digital subscriber line (VDSL) network, the fiber-to-the-home (FTTH) network, the power line communication (PLC) network and the like.

In addition, the external device and the image display apparatus 100 can be connected to each other by wire or wirelessly through the signal transceiver 111. The external device and the image display apparatus 100 can also be connected wirelessly using a short-range communication technology such as BLUETOOTH, Radio Frequency IDentification (RFID), Infrared Data Association (IrDA), Ultra-WideBand (UWB), ZigBee, etc.

Further, the tuner 112 can receive a broadcast signal and/or broadcast associated information from an external broadcast managing entity via a broadcast channel. The broadcast channel may include a satellite channel and a terrestrial channel, and the broadcast managing entity may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. Also, the broadcast signal may further include a data broadcast signal combined with a TV or radio broadcast signal.

Examples of broadcast associated information include information associated with a broadcast channel, a broadcast program, a broadcast service provider, and the like. The broadcast associated information can also be provided via a mobile communication network and also be implemented in various formats. For instance, the broadcast associated information may include an Electronic Program Guide (EPG) of the Digital Multimedia Broadcasting (DMB) system, an Electronic Service Guide (ESG) of the Digital Video Broadcast-Handheld (DVB-H) system, and the like.

The tuner 112 can also be configured to receive digital broadcast signals transmitted from various types of broadcast systems. Such digital broadcast systems may include the Digital Multimedia Broadcasting-Terrestrial (DMB-T) system, the Digital Multimedia Broadcasting-Satellite (DMB-S) system, the Media Forward Link Only (MediaFLO) system, Digital Video Broadcast-Handheld (DVB-H), Integrated Services Digital Broadcast-Terrestrial (ISDB-T) system, etc. The tuner 112 can also be configured to be suitable for other broadcast systems as well as digital broadcast systems.

In addition, the image signal and/or image associated information received by the image receiver 110 can be stored in the memory 150. Also, the image processor 120 can receive an image signal from the image receiver 110 and process the received image signal so as to be output by the image output unit 130. In FIG. 2, the image processor 120 includes a channel buffer 121, a decoder buffer 122 and a decoder 123. In more detail, the channel buffer 121 can receive an image signal from the image receiver 110 and temporarily store the received image signal. The image signal can also be stored in a data stream format as a combination of video data for video reproduction and audio data for audio reproduction.

Further, the data stored in the channel buffer 121 can be deleted after being transmitted to the decoder buffer 122. Alternatively, the data stored in the channel buffer 121 can be stored for a preset time after being transmitted to the decoder buffer 122. In addition, the decoder buffer 122 can temporarily store audio data and video data divided from the data stream. The audio data and the video data temporarily stored in the decoder buffer 122 are then transmitted to the decoder 123.

In addition, the data stored in the decoder buffer 122 can be deleted after being transmitted to the decoder 123. In particular, the data stored in the decoder buffer 122 may be immediately deleted after being transmitted to the decoder 123 or deleted after a preset time elapses after the transmission. Further, the decoder 123 converts the video or audio data into a format to be usable by the controller 140 or the audio output unit 130.

The video and/or audio data can also be in a variety of formats such as a format of audio video interleaved (AVI), MPEG, DivX, XviD, windows media video codec (WMV) or the like and may be encoded/decoded. The image output unit 130 also reproduces image (video) and/or sound (audio) using the data converted by the decoder 123. In FIG. 2, the image output unit 130 includes a display unit 131 and an audio output module 132.

In particular, the display unit 131 can output information processed in the image display apparatus 100. For example, when the image display apparatus 100 is operating in a video output mode, the display unit 131 output videos (e.g., moving picture, motion picture, moving image, etc.). Also, when the image display apparatus 100 is in an Internet communication mode, the display unit 131 displays a user interface (UI) or a graphic user interface (GUI) which includes information associated with the Internet communication.

Further, the display unit 131 may be implemented using, for example, a Liquid Crystal Display (LCD), a Thin Film Transistor-Liquid Crystal Display (TFT-LCD), an Organic Light-Emitting Diode (OLED), a flexible display, a Field Emission Display (FED), a three-dimensional (3D) display, a plasma display panel (PDP), a multi display tube (MDT), a transparent display, etc. In addition, the audio output module 132 can output audio or sound data decoded by the decoder 123, and may be implemented, for example, using a dynamic speaker, an electrostatic speaker, a planar-magnetic speaker and the like.

Also, the controller 140 controls the overall operations of the image display apparatus 100. For example, the controller 140 processes data received via the image receiver 110 or data stored in the memory 150. The controller 140 can also include a digital signal processor (DSP). Further, the memory 150 stores a program for process and control of the controller 140 and/or temporarily stores input/output data. The memory 150 may be implemented using any type of suitable storage medium including a flash memory type, a hard disk type, a multimedia card micro type, a memory card type (e.g., SD or XD memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. In addition, the image display apparatus 100 may operate a web storage on the Internet which performs a storage function of the memory 150.

Further, the user input unit 160 can receive a signal to control the operation of the image display apparatus 100. The signal may indicate a signal to control the operation (Rewind, Fast-Forward, Pause, Record, etc.) of a moving image being currently reproduced. Alternatively, the signal may indicate a signal to control the operation of the image display apparatus 100 such as power ON/OFF, reservation recording, Internet communication module Enable/Disable, short range wireless communication module Enable/Disable, broadcast channel change function, volume control function, mute function, etc. Audio data or video data can also be directly input to the user input unit 160 by a user through a camera or a microphone in addition to the signal to control the operation of the image display apparatus 100. Also, the signals can be input directly by a user or indirectly input using a wired/wireless remote controller.

In addition, the interface unit 170 is implemented to interface the image display apparatus 100 with external devices. The interface unit 170 can also allow a data reception from an external device, a power delivery to each component in the image display apparatus 100, or a data transmission from the image display apparatus 100 to an external device. In particular, the interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

Also, for a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some instances, such embodiments are implemented by the controller 140.

For a software implementation, the embodiments such as procedures and functions may be implemented together with separate software modules each of which performs at least one of functions and operations. The software codes can be implemented with a software application written in any suitable programming language. Also, the software codes may be stored in the memory 150 and executed by the controller 140.

In addition, the image display apparatus 100 can transmit, to the streaming server (SS), through the signal transceiver 111, a signal requesting a bit stream for reproducing a moving image at an arbitrary multiple speed. The image display apparatus 100 can also receive, through the user input unit 160, an input for reproducing a moving image being currently reproduced with a speed faster or slower than a normal speed. Further, the image display apparatus 100 can transmit, to the streaming server (SS), a signal requesting a bit stream for reproducing a moving image at an arbitrary multiple speed input by a user.

Also, the signal transceiver 111 can receive, from the streaming server (SS), a bit stream for reproducing a moving image at an arbitrary multiple speed. The bit stream may be generated using moving image data for multiple speed reproduction separately generated from moving image data for normal speed reproduction and constructed by using I-frames selected from a plurality of group of pictures (GOPs) included in the moving image data for normal speed reproduction.

Preferably, the bit stream is implemented through a combination of framesets. The frameset may be implemented by duplicating an I-frame included in the moving image data for multiple speed reproduction 'n' times, and then by consecutively arranging the 'n' I-frames. Here, the 'n' may be expressed as the following Equation 1.

$$n = N\left(\frac{\text{the number of frames included in one } GOP}{\text{number of multiple speed of a moving image to be reproduced at a multiple speed}}\right),\quad \text{Equation 1}$$

$(N(a) = x, x \le a < x+1, x \text{ is an integer}).$

The bit stream is also preferably a bit stream for reproducing a moving image at an arbitrary multiple speed, and may be generated by using I-frames each selected from one of a plurality of framesets, in which the plurality of framesets are composed of different $2^n$ I-frames which constitute the moving image data for multiple speed reproduction. Here, 'n' may be a natural number. In addition, the controller 140 in FIG. 2 can reproduce a moving image at an arbitrary multiple speed through the image output unit 130 by using the received bit stream.

Hereinafter, the image transmitting apparatus 200 according to an embodiment of the present invention will be explained with respect to FIG. 3. As shown in FIG. 3, the image transmitting apparatus 200 includes a database 210 that can store moving image data for multiple speed reproduction separately generated from moving image data for normal speed reproduction and constructed using I-frames selected from a plurality of group of pictures (GOPs) included in the moving image data for normal speed reproduction.

The image transmitting apparatus 200 can also generate and store moving image data for multiple speed reproduction separately from moving image data for normal speed reproduction. Further, the image transmitting apparatus 200 can transmit the stored moving image data for multiple speed reproduction in response to request from the streaming client (SC). Preferably, the moving image data for normal speed reproduction, and the moving image data for multiple speed reproduction constitute different files, and the moving image data for normal speed reproduction, and the moving image data for multiple speed reproduction constitute one file.

When the moving image data for normal speed reproduction and the moving image data for multiple speed reproduction constitute one file, the one file may include a file header having position information, etc., the position information indicating positions of the respective moving image data in the file. In addition, the moving image data for multiple speed reproduction is constituted with a set of I-frames extracted from a plurality of group of pictures (GOPs) included in the moving image data for normal speed reproduction. The I-frames stored in the moving image data for multiple speed reproduction may also constitute GOPs composed of sets of the I-frames. In this instance, the moving image data for multiple speed reproduction may further include metadata configured to store information about GOPs composed of the frames included in the moving image data for multiple speed reproduction.

In addition, the metadata of the moving image data for multiple speed reproduction may include information relating to a position and a size of each GOP included in the moving image data for multiple speed reproduction. Also, the database 210 can store moving image data for multiple speed reproduction, and the controller 220 can generate a bit stream used to reproduce a moving image at an arbitrary multiple speed requested through a data transceiver 240, and transmit the bit stream through the data transceiver 240.

The controller 220 can also generate a bit stream used to reproduce moving image at the requested arbitrary multiple speed using the moving image data for multiple speed reproduction composed of sets of the I-frames. In addition, the bit stream is preferably implemented through a combination of framesets, and the frameset can be implemented by duplicating an I-frame included in the moving image data for multiple speed reproduction 'n' times, and then by consecutively arranging the 'n' I-frames. Here, 'n' may be expressed as the Equation 1.

The bit stream is also preferably a bit stream for reproducing a moving image at an arbitrary multiple speed, and may be generated by using I-frames each selected from one of a plurality of framesets, the plurality of framesets each being composed of different $2^n$ I-frames which constitute the moving image data for multiple speed reproduction. Here, 'n' may be a natural number.

The database 210 can also store one or more moving image data composed of a bit stream for reproducing a moving image at one or more preset multiple speeds. In addition, the controller 220 can select moving image data composed of a bit stream, which matches the requested arbitrary multiple speed received through the data transceiver 240, among the stored one or more moving image data, and then transmit the selected moving image data through the data transceiver 240.

The data transceiver 240 can also receive, from the streaming client (SC), a signal requesting a bit stream for reproducing a moving image at an arbitrary multiple speed. The data transceiver 240 can further receive information relating to a multiple speed of a moving image to be reproduced, or information relating to a position of a moving image sector to be reproduced at a multiple speed. Here, the information may be received by being included in the signal requesting a bit stream, or may be received together with the signal requesting a bit stream.

The data transceiver 240 can also transmit, to the streaming client (SC), the bit stream for reproducing a moving image at an arbitrary multiple speed according to the request. Also, the controller 220 can control the data transceiver 240 to transmit the bit stream for reproducing a moving image at an arbitrary multiple speed using the moving image data stored in the data base 210. Further, the controller 220 can generate the bit stream for reproducing a moving image at an arbitrary multiple speed according to the request received from the streaming client (SC).

Alternatively, the controller 220 can select a bit stream for reproducing a moving image at an arbitrary multiple speed which matches the request, among the one or more moving image data stored in the database 210, and then transmit the selected moving image data through the data transceiver 240.

Hereinafter, a recording medium according to the present invention will be explained in more detail with reference to the attached drawings. In addition, the recording medium according to embodiments of the present invention correspond to a computer-readable recording medium capable of reading and writing electric data. The recording medium may also include at least one of a flash memory type, a hard disk type, a multimedia card micro type, a card type (e.g., SD or XD memory, etc.), Random Access Memory (RAM) Static Random Access Memory (SRAM), Read-Only Memory (ROM), Electrically Erasable Programmable Read-Only Memory (EEPROM), Programmable Read-Only Memory (PROM), a magnetic memory, a magnetic disc, and an optical disc.

Figure 4:
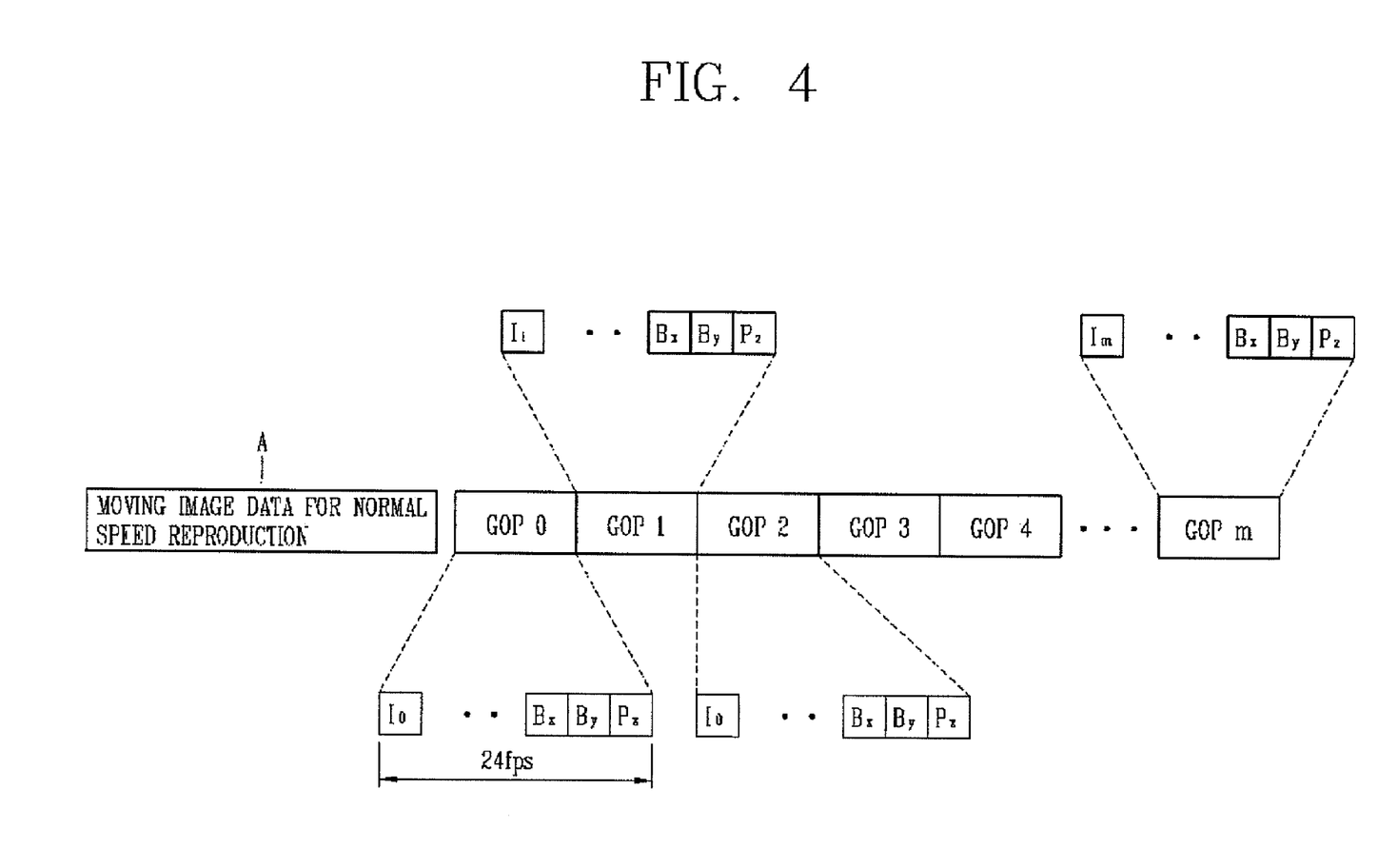
FIG. 4 is a view showing a structure of moving image data for normal speed reproduction according to one embodiment of the present invention.

In more detail, FIG. 4 is a view showing a structure of moving image data for normal speed reproduction according to one embodiment of the present invention. Further, the moving image data (A) for normal speed reproduction may be constituted with a set of GOPs, each GOP (group of pictures) composed of a plurality of frames.

According to the MPEG standard for decoding and encoding of a moving image, moving image data is constituted with a set of GOPs, a basic unit of the encoding. The GOP indicates a frameset from one I-frame to the following I-frame. In particular, the GOP is composed of an I-frame (Intra-frame), B-frames (Bidirectional-frame), and P-frames (Predicted-frame). The frame indicates a data unit containing information used to reproduce individual stationary screens constituting a moving image.

The 'I-frame' is called as a key frame, and indicates data containing compression information with respect to one arbitrary screen of a moving image. The 'I-frame' includes moving image data having a highest picture quality, and generally has a maximum capacity. The 'P-frame' indicates data which constitutes a screen based on information of a previous key frame. The 'P-frame' has a picture quality and a capacity lower than those of the 'I-frame' but higher than those of 'B-frame'. The 'B-frame' indicates data which constitutes a screen based on a preceding key frame and a following key frame. The 'B-frame' has a smallest capacity and a lowest picture quality among the frames.

As shown in FIG. 4, the number of frames included in the GOP may be set to be constant. For encoding moving image data of 24 fps (frame per second), 24 frames may be reproduced while the moving image data is being reproduced for one second. Here, one GOP may be composed of a set of 24 frames.

Figure 5A:
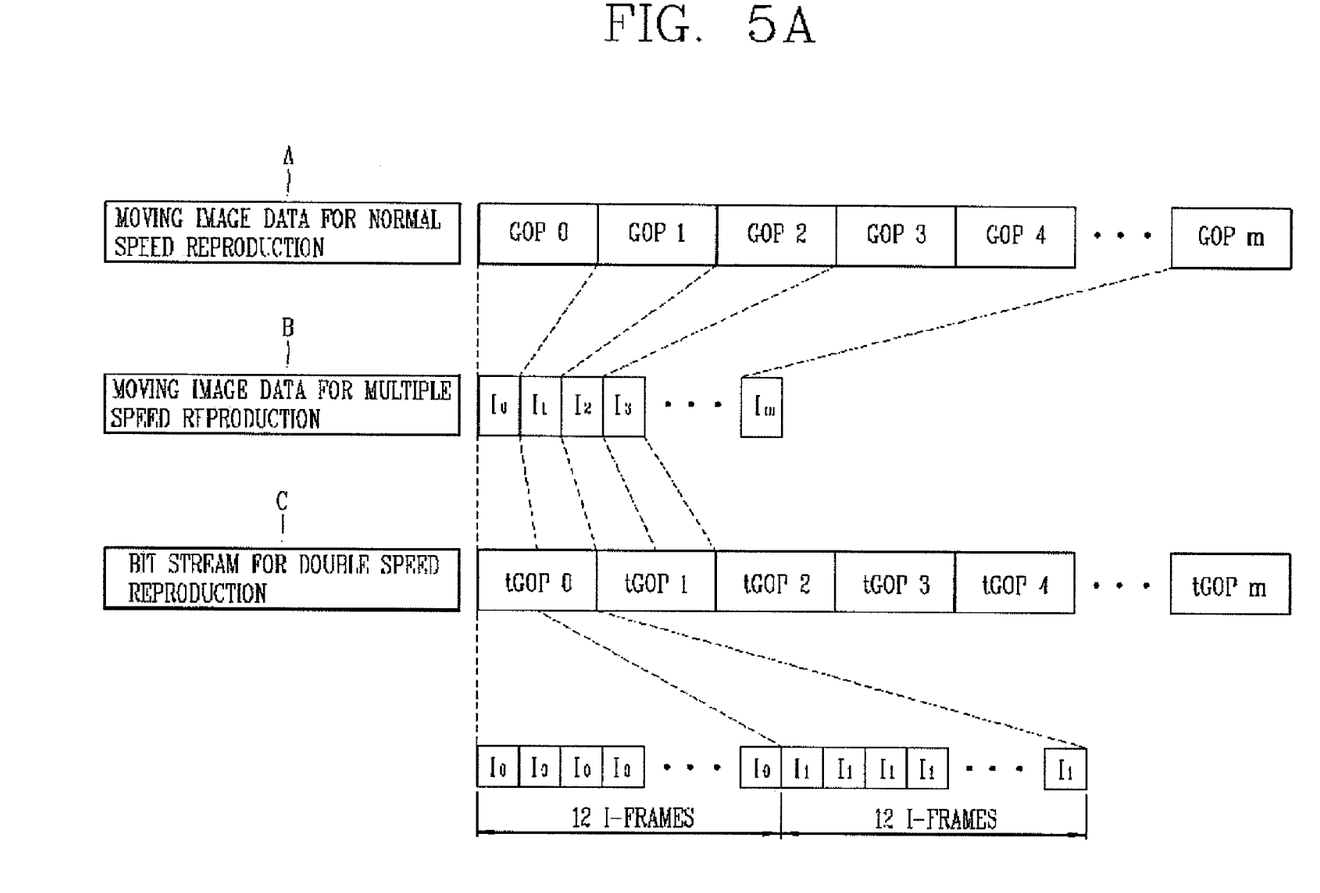
FIG. 5A is a view showing a structure of moving image data for multiple speed reproduction according to one embodiment of the present invention.

Next, FIG. 5A is a view showing a structure of moving image data for multiple speed reproduction according to one embodiment of the present invention. The moving image data (A) for normal speed reproduction in this example is composed of a plurality of GOPs (GOP0, GOP1, GOP2, GOPm). The moving image data (B) for multiple speed reproduction is also composed of a plurality of I-frames (I0, I1, I2, . . . , Im) selected from the plurality of GOPs (GOP0, GOP1, GOP2, GOPm) included in the moving image data (A) for normal speed reproduction. The image transmitting apparatus 200 can then generate a bit stream for reproducing a moving image at a 2× speed using the moving image data (B) for multiple speed reproduction as follows.

Further, assuming the moving image data of 24 fps has been encoded, the moving image data reproduces 24 frames for one second. In addition, the bit stream (C) for double speed reproduction includes through combination of framesets. Also, the frameset may be generated by duplicating one I-frame selected among the plurality of I-frames (I0, I1, I2, . . . , Im) included in the moving image data (B) for multiple speed reproduction 'n' times, and then by consecutively arranging the duplicated I-frames.

The 'n' may be determined by the Equation 1. In the Equation 1, the number of frames included in one GOP indicates the number of frames preset to be included in one GOP when reproducing moving image data. For instance, when encoding moving image data of 24 fps for reproduction, the number of frames included in one GOP is 24. In the Equation 1, the number of multiple speed of a moving image to be reproduced at a multiple speed indicates a ratio of a moving image to be reproduced at a multiple speed, with respect to a reproduction speed of moving image data for normal speed reproduction. For instance, when a user is to reproduce a moving image with a double (2×) speed, the number of multiple speed of a moving image to be reproduced at a multiple speed is 2.

Referring to FIG. 5A, the number of frames included in one GOP is 24, and the number of multiple speeds of a moving image to be reproduced at a multiple speed is 2. As a result, 'n' is 12. Accordingly, the image transmitting apparatus 200 duplicates an 'I-frame' included in the moving image data (B) for multiple speed reproduction 12 times. Then, the image transmitting apparatus 200 can generate framesets, each set being generated by consecutively arranging the twelve duplicated frames.

FIG. 5A shows that moving image data is to be reproduced at a double speed. However, the number of multiple speeds may be set as a positive real number such as 2.5×, 3×, 4×, and 5×. For instance, when a user's desired reproduction speed is 2.5× and moving image data of 24 fps has been encoded, the 'n' may be determined as the following value, $$n = N\left(\frac{24}{2.5}\right) = 9.$$

Accordingly, the image transmitting apparatus 200 can generate framesets by duplicating the 'I-frames' included in the moving image data (B) for multiple speed reproduction 9 times, respectively, and then by consecutively arranging each set of the nine duplicated I-frames. The bit stream (C) for double speed reproduction may also include a combination of the frames. When the streaming client (SC) is to reproduce the bit stream (C) for double speed reproduction, the streaming client (SC) can reproduce a plurality of GOPs (tGOP0, tGOP1, tGOP2, . . . , tGOPm) included in the bit stream (C) for double speed reproduction, at the same speed as a reproduction speed of the plurality of GOPs (GOP0, GOP1, GOP2, ..., GOPm) included in the moving image data (A) for normal speed reproduction.

As shown in FIG. 5A, the tGOP0 included in the bit stream (C) for double speed reproduction includes I0 and I1 frames included in two GOPs (GOP0 and GOP1) included in the moving image data (A) for normal speed reproduction. Accordingly, when the streaming client (SC) is to reproduce the bit stream (C) for double speed reproduction, one tGOP0 has only to be reproduced. This provides the same effect as the effect of reproducing the two GOPs (GOP0 and GOP1) included in the moving image data (A) for normal speed reproduction. Further, the streaming client (SC) recognizes that moving image data is being reproduced with a double (2×) speed of a speed of the moving image data (A) for normal speed reproduction.

Figure 5B:
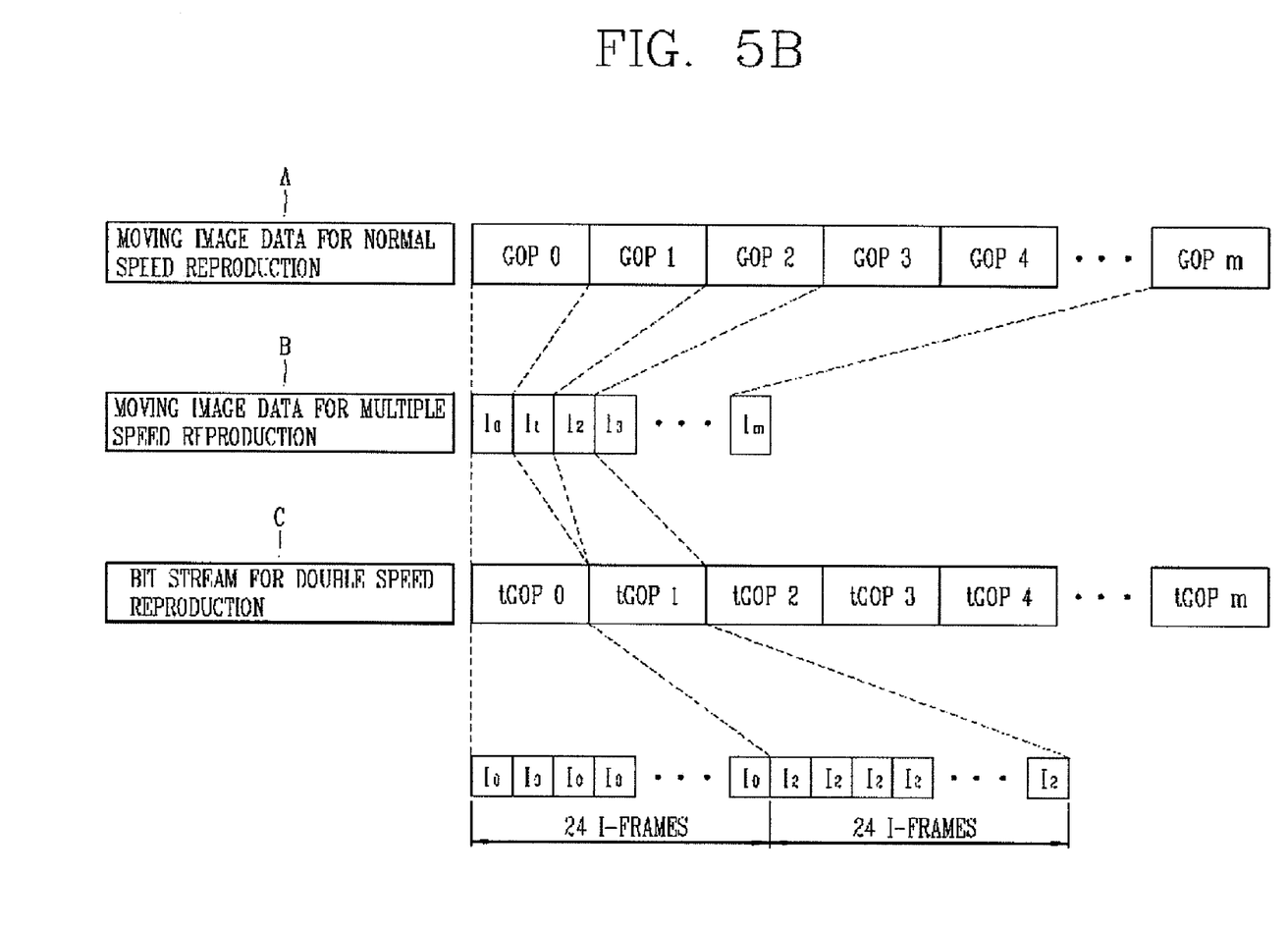
FIG. 5B is a view showing a structure of moving image data for multiple speed reproduction according to another embodiment of the present invention.

Next, FIG. 5B is a view showing a structure of moving image data for multiple speed reproduction according to another embodiment of the present invention. The bit stream (C) for double speed reproduction may be generated in a manner different from the manner shown in FIG. 5A. Further, the method for generating moving image data (B) for multiple speed reproduction is the same as the method shown in FIG. 5A, and thus its detailed explanations will be omitted.

The bit stream may be a bit stream for reproducing a moving image at an arbitrary multiple speed, and also be generated using I-frames each selected from one of a plurality of framesets, the plurality of framesets each being composed of different $2^n$ I-frames which constitute the moving image data (B) for multiple speed reproduction. Also, 'n' is a natural number.

In FIG. 5B, assuming the image transmitting apparatus 200 generates the bit stream (C) for double speed reproduction, then each of the plurality of framesets is composed of different two I-frames, which constitute the moving image data (B) for multiple speed reproduction. Here, 'n' is one. In this instance, the moving image data (B) for multiple speed reproduction includes a combination of the framesets, such as {I0, I1}, {I2, I3}, ..., {Im−1, Im}.

The bit stream (C) for double speed reproduction can also be generated using I-frames each selected from one of the framesets. As shown in FIG. 5B, the bit stream (C) for double speed reproduction can be generated using 'I0' selected form {I0, I1}, and 'I2' selected from {I2, I3}, etc. Each of the I-frames may also be duplicated by the number of frames included in one GOP, thereby constituting the bit stream (C) for double speed reproduction. As shown in FIG. 5B, for encoding a moving image of 24 fps, the number of frames included in one GOP is 24. Accordingly, one I-frame may be duplicated 24 times.

In addition, the bit stream (C) for double speed reproduction is constituted with new GOPs (tGOP0, tGOP1, tGOP2, ..., tGOPm) generated by skipping one GOP per two GOPs among the plurality of GOPs (GOP0, GOP1, GOP2, ..., GOPm) included in the moving image data (A) for normal speed reproduction. Accordingly, the streaming client (SC) can recognize that moving image data is being reproduced with a double speed of a speed of the moving image data (A) for normal speed reproduction.

Further, FIG. 5B shows that the image transmitting apparatus 200 generates moving image data with a double speed. However, the image transmitting apparatus 200 can also generate moving image data reproduced at a multiple speed of 4, 8, 16 ... $2^m$ obtained by differently setting the 'n' included in the $2^n$, the number of I-frames which constitute each of the framesets. Here, 'm' may be a natural number.

The moving image data (B) for multiple speed reproduction, or the bit stream (C) for double speed reproduction shown in FIGS. 5A and 5B can also be stored in the database 210 of the image transmitting apparatus 200. Alternatively, the database 210 can store only the moving image data (B) for multiple speed reproduction, and the controller 220 of the image transmitting apparatus 200 can generate a bit stream for generating a moving image at an arbitrary multiple speed matching with a request received from the streaming client (SC). Still alternatively, the database 210 of the image transmitting apparatus 200 can store one or more moving image data composed of a bit stream for reproducing a moving image at one or more preset multiple speeds, as well as the bit stream (C) for double speed reproduction.

Figure 6:
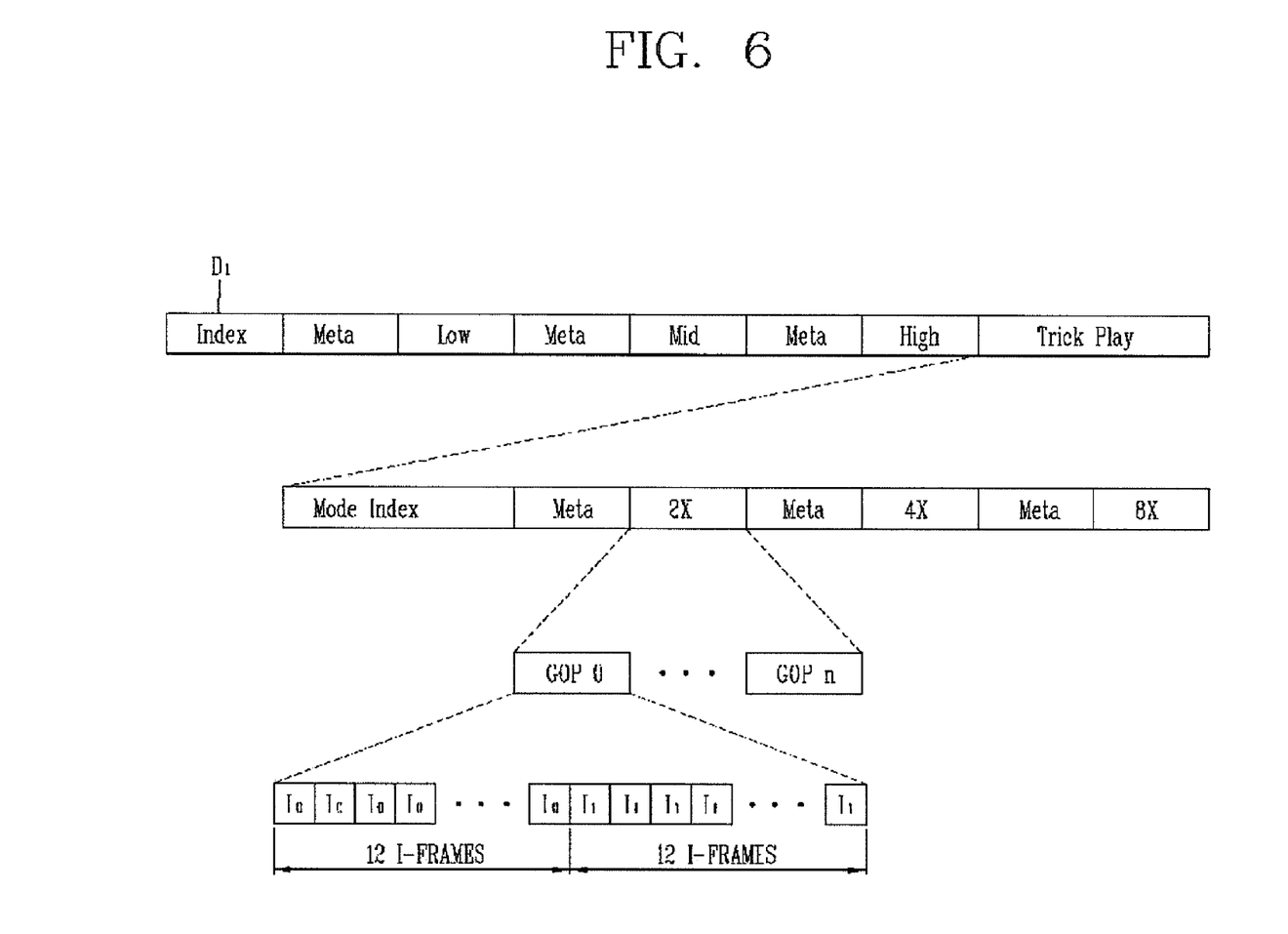
FIG. 6 is a view showing a structure of moving image data according to one embodiment of the present invention.

Next, FIG. 6 is a view showing a structure of moving image data according to one embodiment of the present invention. As shown in FIG. 6, the moving image data for normal speed reproduction, and the moving image data for multiple speed reproduction may constitute one file (D1). The one file (D1) includes a file header having position information (Index), etc., the position information indicating positions of the respective moving image data in the file.

The moving image data for normal speed reproduction may also be composed of a plurality of moving image data that can be reproduced with different picture qualities (Low, Mid, High). The plurality of moving image data may include metadata having picture quality information of the moving image data. The one file (D1) includes moving image data (Trick Play) for multiple speed reproduction at one part thereof. The moving image data (Trick Play) for multiple speed reproduction also includes a plurality of moving image data for reproducing a moving image with different multiple speeds (2×, 4× and 8×). The moving image data (Trick Play) for multiple speed reproduction may also include metadata including multiple speed information of each moving image data.

Figure 7:
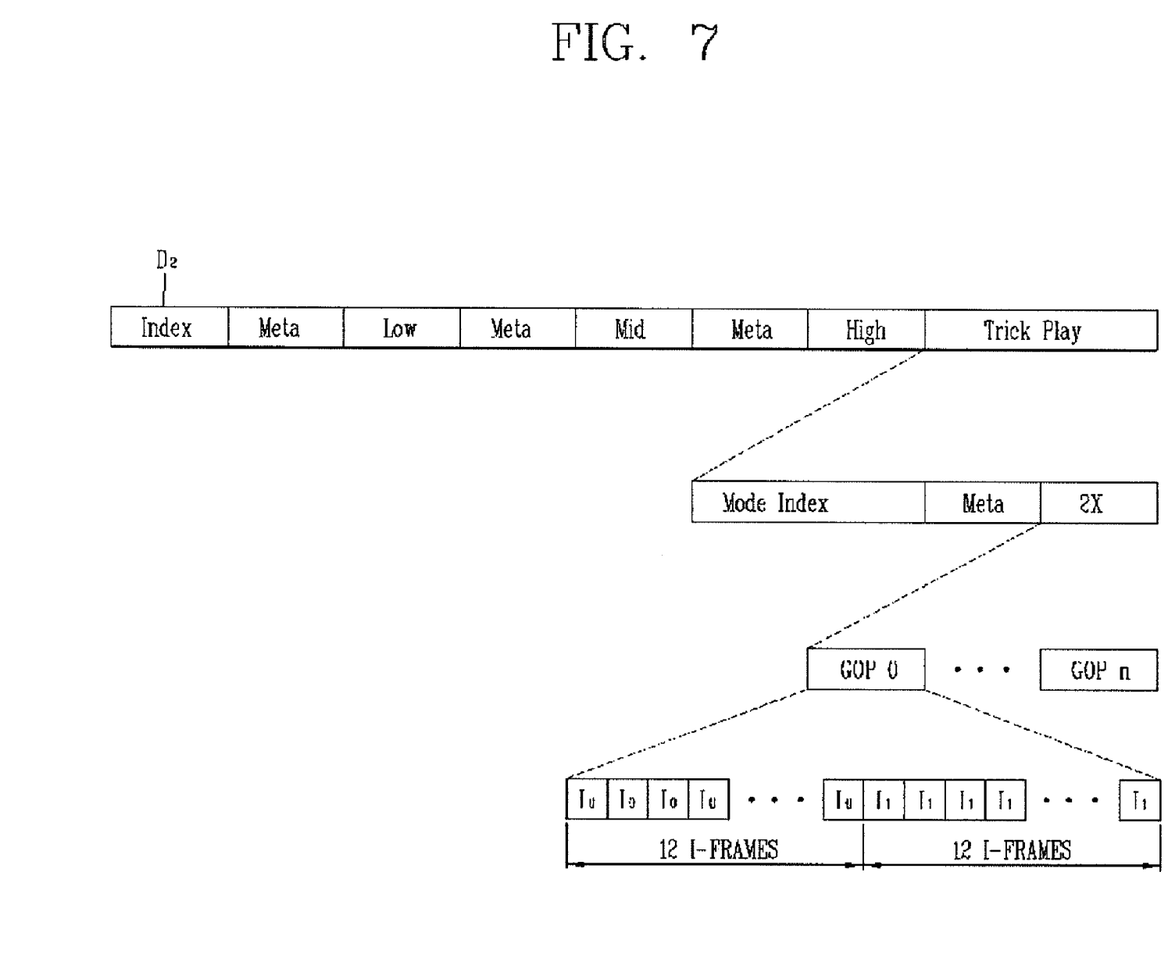
FIG. 7 is a view showing a structure of moving image data according to another embodiment of the present invention.

Next, FIG. 7 is a view showing a structure of moving image data according to another embodiment of the present invention. As shown in FIG. 7, the moving image data for normal speed reproduction, and the moving image data for multiple speed reproduction may constitute one file (D2).

The moving image data (Trick Play) for multiple speed reproduction shown in FIG. 6 includes a plurality of moving image data for reproducing a moving image with different multiple speeds (2×, 4×, 8×), whereas the moving image data (Trick Play) for multiple speed reproduction shown in FIG. 7 includes only moving image data for reproducing a moving image with one multiple speed (2×). In addition, the moving image data (Trick Play) for multiple speed reproduction shown in FIG. 7 may include a set of I-frames extracted from a plurality of GOPs, which constitute the moving image data for normal speed reproduction, rather than the moving image data for reproducing a moving image at a double speed. The moving image data for reproducing a moving image with one multiple speed may be used for the image transmitting apparatus 200 to generate moving image data for reproducing a moving image with different multiple speed.

Figure 8:
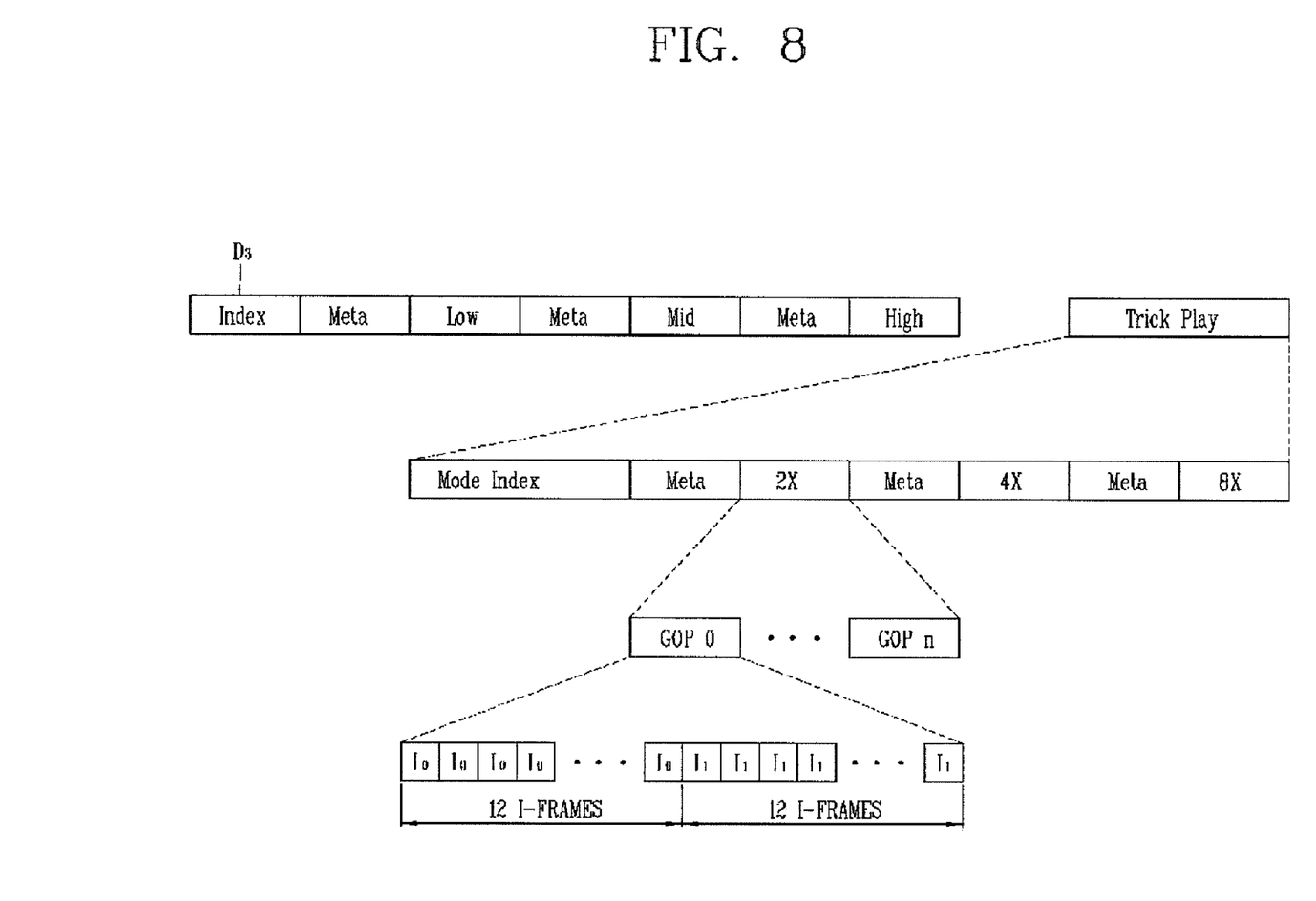
FIG. 8 is a view showing a structure of moving image data according to still another embodiment of the present invention.

FIG. 8 is a view showing a structure of moving image data according to still another embodiment of the present invention. As shown in FIG. 8 the moving image data for normal speed reproduction, and the moving image data for multiple speed reproduction may constitute different files.

Separately from a file (D3) including the moving image data for normal speed reproduction, may exist another file having the moving image data (Trick Play) for multiple speed reproduction stored therein. The moving image data (Trick Play) for multiple speed reproduction shown in FIG. 8 includes a plurality of moving image data for reproducing a moving image with different multiple speeds (2×, 4×, 8×). However, moving image data (Trick Play) for multiple speed reproduction shown in FIG. 8 may include only moving image data for reproducing a moving image with one multiple speeds (2×) like the moving image data (Trick Play) for multiple speed reproduction shown in FIG. 7.

However, the moving image data (Trick Play) for multiple speed reproduction shown in FIG. 8 may also include a set of I-frames extracted from a plurality of GOPs which constitute the moving image data for normal speed reproduction, rather than the moving image data for reproducing a moving image at a 2× speed.

The moving image data for reproducing a moving image with one multiple speed may be used for the image transmitting apparatus 200 to generate moving image data for reproducing a moving image with different multiple speeds.

Figure 9:
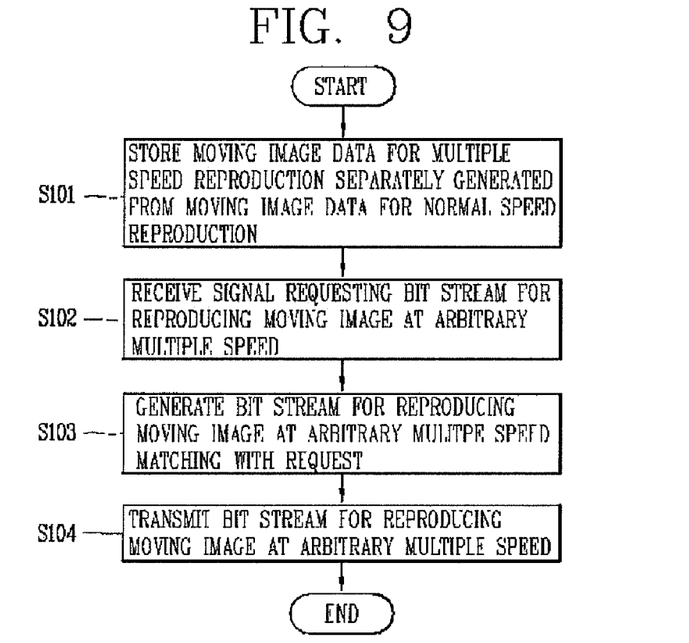
FIG. 9 is a flowchart showing an image transmitting method according to one embodiment of the present invention.

Hereinafter, an image transmitting method according to the present invention will be explained in more detail. In particular, FIG. 9 is a flowchart showing an image transmitting method according to one embodiment of the present invention. As shown in FIG. 9, the streaming server (SS) stores moving image data for multiple speed reproduction separately generated from moving image data for normal speed reproduction and constructed by using I-frames selected from a plurality of group of pictures (GOPs) included in the moving image data for normal speed reproduction (S101).

Once the streaming server (SS) receives a signal requesting a bit stream for reproducing a moving image at an arbitrary multiple speed from the streaming client (SC) (S102), the streaming server (SS) generates the bit stream for reproducing a moving image at an arbitrary multiple speed, which matches the request (S103).

Preferably, the bit stream (C) includes a combination of the framesets. The frameset may be generated by duplicating an I-frame included in the moving image data for multiple speed reproduction 'n' times, and then by consecutively arranging the duplicated I-frames. Also, the bit stream (C) may be a bit stream for reproducing a moving image at an arbitrary multiple speed matching with the request, and the 'n' may be determined by the Equation 1.

Still preferably, the bit stream is a bit stream for reproducing a moving image at an arbitrary multiple speed, and may be generated by using I-frames each selected from one of a plurality of framesets, the plurality of framesets each being composed of different $2^n$ I-frames which constitute the moving image data for multiple speed reproduction. Here, the 'n' may be a natural number. The streaming server (SS) can also transmit the bit stream for reproducing a moving image at an arbitrary multiple speed, to the streaming client (S104).

Figure 10:
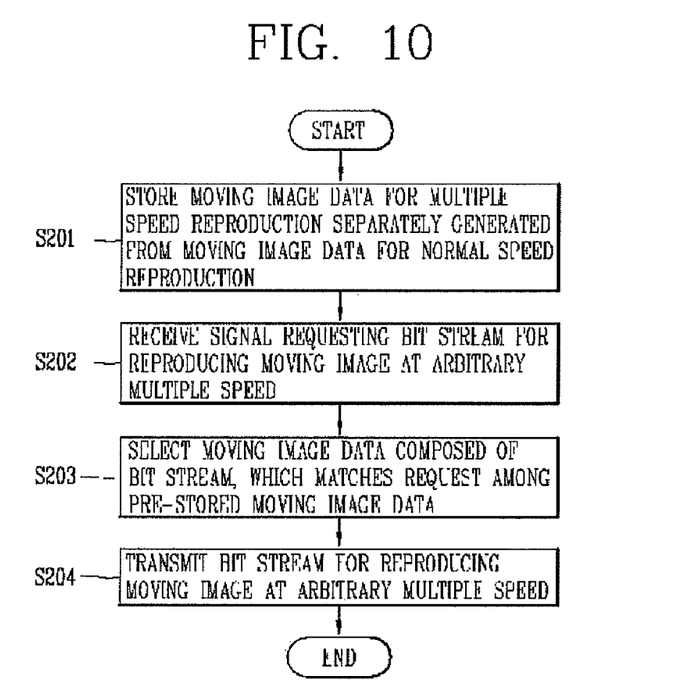
FIG. 10 is a flowchart showing an image transmitting method according to another embodiment of the present invention.

Next, FIG. 10 is a flowchart showing an image transmitting method according to another embodiment of the present invention. As shown in FIG. 10, the streaming server (SS) stores moving image data for multiple speed reproduction separately generated from moving image data for normal speed reproduction and constructed by using I-frames selected from a plurality of group of pictures (GOPs) included in the moving image data for normal speed reproduction (S201).

Preferably, the streaming server (SS) stores one or more moving image data composed of a bit stream for reproducing a moving image at one or more preset multiple speeds. Once the streaming server (SS) receives a signal requesting a bit stream for reproducing a moving image at an arbitrary multiple speed from the streaming client (SC) (S202), the streaming server (SS) selects moving image data composed of a bit stream, which match the requested arbitrary multiple speed, among the stored one or more moving image data (S203). The streaming server (SS) then transmits the bit stream for reproducing a moving image at an arbitrary multiple speed, to the streaming client (S204).

Preferably, the bit stream includes a combination of the framesets. The frameset may be generated by duplicating an I-frame included in the moving image data for multiple speed reproduction 'n' times, and then by consecutively arranging the duplicated I-frames. Also, the bit stream may be a bit stream for reproducing a moving image at an arbitrary multiple speed matching with the request, and the 'n' may be determined by the Equation 1.

Still preferably, the bit stream is a bit stream for reproducing a moving image at an arbitrary multiple speed, and is generated by using I-frames each selected from one of a plurality of framesets, the plurality of framesets each composed of different $2^n$ I-frames which constitute the moving image data for multiple speed reproduction. Here, the 'n' may be a natural number.

In the image transmitting method according to embodiments of the present invention, moving image data that can be reproduced at a multiple speed is transmitted. This allows a moving image received by the client to be reproduced at a multiple speed without undergoing an edition procedure.

The aforementioned method may be implemented as a program code stored in a computer-readable storage medium. The storage medium may include ROM, RAM, CD-ROM, a magnetic tape, a floppy disc, an optical data storage device, etc. The storage medium may also include Internet transmission.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An image transmitting apparatus, comprising:
a database configured to store first moving image data for multiple speed reproduction separately generated from second moving image data for normal speed reproduction, the first moving image data being constructed using I-frames selected from a plurality of group of pictures (GOPs) included in the second moving image data;
a data transceiver configured to receive a signal requesting a bit stream for reproducing a moving image at an arbitrary multiple speed, and to transmit the bit stream for reproducing a moving image at an arbitrary multiple speed according to the signal; and
a controller configured to control transmission of the bit stream for reproducing a moving image at the arbitrary multiple speed based on the first moving image data stored in the database, wherein the bit stream for reproducing a moving image at an arbitrary multiple speed includes a combination of framesets, wherein each frameset is generated by duplicating an I-frame included in the first moving image data 'n' times, and then by consecutively arranging the 'n' I-frames, and wherein the 'n' is expressed as the following equation:

$$n = N\left(\frac{\text{the number of frames included in one } GOP}{\substack{\text{number of multiple speed of a moving} \\ \text{image to be reproduced at a multiple speed}}}\right),$$

$(N(a) = x, \ x \leq a < x+1, \ x \text{ is an integer}).$

2. The image transmitting apparatus of claim 1, wherein the first moving image data and the second moving image data constitute different files.

3. The image transmitting apparatus of claim 1, wherein the first moving image data and the second moving image data constitute one file.

4. The image transmitting apparatus of claim 1, wherein the first moving image data further includes metadata relating to one of the plurality of GOPs composed of frames included in the first moving image data.

5. The image transmitting apparatus of claim 1, wherein the bit stream for reproducing a moving image at the arbitrary multiple speed is generated using I-frames, each I-frame being selected from one of a plurality of framesets, the plurality of framesets each including different $2^n$ I-frames which constitute the first moving image data, and wherein the 'n' is a natural number.

6. The image transmitting apparatus of claim 1, wherein the controller is further configured to generate the bit stream for reproducing a moving image at the arbitrary multiple speed according to the signal.

7. The image transmitting apparatus of claim 1, wherein the database is further configured to store one or more bit streams for reproducing a moving image at one or more preset multiple speeds, and wherein the controller is further configured to store moving image data composed of a bit stream matching a requested arbitrary multiple speed, from the stored one or more bit streams, and then transmit the selected bit streams with the data transceiver.

8. An image display apparatus, comprising:

a signal transceiver configured to transmit a signal requesting a bit stream for reproducing a moving image at an arbitrary multiple speed, and to receive the bit stream for reproducing a moving image at an arbitrary multiple speed; and a controller configured to reproduce the moving image at an arbitrary multiple speed through an image output unit, wherein the bit stream for reproducing a moving image at the arbitrary multiple speed is generated using first moving image data for multiple speed reproduction separately generated from second moving image data for normal speed reproduction, the first moving image data constructed using I-frames selected from a plurality of group of pictures (GOPs) included in the second moving image data, wherein the bit stream for reproducing the moving image at the arbitrary multiple speed includes a combination of framesets, wherein each frameset is generated by duplicating an I-frame included in the first moving image data 'n' times, and then by consecutively arranging the 'n' I-frames, and wherein the 'n' is expressed as a following equation:

$$n = N\left(\frac{\text{the number of frames included in one } GOP}{\substack{\text{number of multiple speed of a moving} \\ \text{image to be reproduced at a multiple speed}}}\right),$$

$(N(a) = x, \ x \leq a < x+1, \ x \text{ is an integer}).$

9. The image display apparatus of claim 8, wherein the bit stream is a bit stream for reproducing the moving image at the arbitrary multiple speed, and is generated using I-frames, each I-frame being selected from a plurality of framesets, the plurality of framesets each including different $2^n$ I-frames which constitute the first moving image data, and wherein the 'n' is a natural number.

10. An image transmitting method, comprising:

storing first moving image data for multiple speed reproduction separately generated from second moving image data for normal speed reproduction, the first moving image data being generated using I-frames selected from a plurality of group of pictures (GOPs) included in the second moving image data;

receiving a signal requesting a bit stream for reproducing a moving image at an arbitrary multiple speed; and transmitting the bit stream for reproducing the moving image at the arbitrary multiple speed according to the signal, wherein the bit stream for reproducing the moving image at the arbitrary multiple speed includes a combination of framesets, wherein each frameset is generated by duplicating an I-frame included in the first moving image data 'n' times, and then by consecutively arranging the 'n' I-frames, and wherein the 'n' is expressed as a following Equation, $$n = N\left(\frac{\text{the number of frames included in one } GOP}{\substack{\text{number of multiple speed of a moving} \\ \text{image to be reproduced at a multiple speed}}}\right),$$

$(N(a) = x, \ x \leq a < x+1, \ x \text{ is an integer}).$

11. The image transmitting method of claim 10, wherein the bit stream is a bit stream for reproducing the moving image at the arbitrary multiple speed, and is generated using I-frames, each I-frame being selected from one of a plurality of framesets, the plurality of framesets each including of different $2^n$ I-frames which constitute the first moving image data, and wherein the 'n' is a natural number.

12. The image transmitting method of claim 10, further comprising:

generating the bit stream for reproducing the moving image at the arbitrary multiple speed according to the signal.

13. The image transmitting method of claim 10, further comprising:

storing one or more bit streams for reproducing a moving image at one or more preset multiple speeds, and transmitting a bit stream matching a requested arbitrary multiple speed from the stored one or more bit streams.

14. A storage medium, comprising:

first moving image data for normal speed reproduction;

second moving image data for multiple speed reproduction separately generated from the first moving image data and generated using I-frames selected from a plurality of group of pictures (GOPs) included in the first moving image data; and a bit stream including a combination of framesets, each frameset being generated by duplicating an I-frame included in the second moving image data 'n' times, and then by consecutively arranging the 'n' I-frames, wherein the 'n' is expressed as a following Equation, $$n = N\left(\frac{\text{the number of frames included in one } GOP}{\text{number of multiple speed of a moving image to be reproduced at a multiple speed}}\right),$$

$(N(a) = x, x \leq a < x + 1, x \text{ is an integer}).$

15. The storage medium of claim 14, wherein the first moving image data and the second moving image data constitute different files.

16. The storage medium of claim 14, wherein the frist moving image data and the second moving image data constitute one file.

17. The storage medium of claim 14, wherein the second moving image data further includes metadata relating to a GOP (group of pictures) including frames included in the second moving image data.

18. The storage medium of claim 14, further comprising:

one or more bit streams for reproducing a moving image at one or more preset multiple speeds.

19. The storage medium of claim 14, wherein the storage medium is one of a flash memory type, a hard disk type, a multimedia card micro type, a card type (e.g., SD or XD memory, etc.), Random Access Memory(RAM) Static Random Access Memory(SRAM), Read-Only Memory(ROM), Electrically Erasable Programmable Read-Only Memory (EEPROM), Programmable Read-Only Memory(PROM), a magnetic memory, a magnetic disc, and an optical disc.

* * * * *